US007024520B2

(12) United States Patent
Tierney et al.

(10) Patent No.: US 7,024,520 B2
(45) Date of Patent: Apr. 4, 2006

(54) SYSTEM AND METHOD ENABLING EFFICIENT CACHE LINE REUSE IN A COMPUTER SYSTEM

(75) Inventors: Gregory E. Tierney, Chelmsford, MA (US); Stephen R. Van Doren, Northborough, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 429 days.

(21) Appl. No.: 10/263,740

(22) Filed: Oct. 3, 2002

(65) Prior Publication Data

US 2004/0068616 A1  Apr. 8, 2004

(51) Int. Cl.
 *G06F 12/00* (2006.01)
(52) U.S. Cl. .................................... 711/141
(58) Field of Classification Search ............... 709/213, 709/244; 711/141, 143, 144, 145, 146, 156, 711/173
 See application file for complete search history.

(56) References Cited

U.S. PATENT DOCUMENTS

| 4,847,804 | A |   | 7/1989  | Shaffer et al. |
| 5,222,224 | A |   | 6/1993  | Flynn et al. |
| 5,233,616 | A |   | 8/1993  | Callander |
| 5,297,269 | A |   | 3/1994  | Donaldson et al. |
| 5,303,362 | A |   | 4/1994  | Butts, Jr. et al. |
| 5,313,609 | A |   | 5/1994  | Baylor et al. |
| 5,490,261 | A |   | 2/1996  | Bean et al. |
| 5,530,933 | A |   | 6/1996  | Frink et al. |
| 5,537,575 | A |   | 7/1996  | Foley et al. |
| 5,551,005 | A |   | 8/1996  | Sarangdhar et al. |
| 5,579,504 | A |   | 11/1996 | Callander et al. |
| 5,608,893 | A |   | 3/1997  | Slingwine et al. |
| 5,737,757 | A |   | 4/1998  | Hassoun et al. |
| 5,761,731 | A |   | 6/1998  | Van Doren et al. |
| 5,905,998 | A | * | 5/1999  | Ebrahim et al. ............ 711/144 |
| 5,911,052 | A | * | 6/1999  | Singhal et al. ............... 710/113 |
| 6,014,690 | A |   | 1/2000  | Van Doren et al. |
| 6,055,605 | A |   | 4/2000  | Sharma et al. |
| 6,061,765 | A | * | 5/2000  | Van Doren et al. ......... 711/145 |

(Continued)

FOREIGN PATENT DOCUMENTS

EP         0 817 074 A1    7/1998

OTHER PUBLICATIONS

Gharachorloo, K., Lenoski, D., Laudon, J., Gibbons, P., Gupta, A. and Hennessey, J., Memory Consistency and Event Ordering in Scalable Shared-Memory Multiprocessors, (c) 1990 IEEE, pp. 15-26.

(Continued)

*Primary Examiner*—Christian P. Chace

(57) ABSTRACT

A system permits unacknowledged write backs in a computer. The computer has a plurality of processors and a shared memory. The shared memory stores data in terms of memory blocks, and each processor has a cache. Associated with each cache line is a tag containing the address of the block at that line, and its state. A duplicate copy of the tag information (DTAG) for each processor cache is also provided, and each section of the DTAG that corresponds to a given processor is organized into a primary DTAG region and a secondary DTAG region. The secondary DTAG region preferably stores tag information for a dirty version of a block, while the write back of the block is in flight to memory. This frees the primary DTAG region to store tag information for a block other than the dirty block, but using the same cache line.

20 Claims, 9 Drawing Sheets

U.S. PATENT DOCUMENTS

| | | | |
|---|---|---|---|
| 6,088,771 | A | 7/2000 | Steely, Jr. et al. |
| 6,094,686 | A | 7/2000 | Sharma |
| 6,101,420 | A | 8/2000 | Van Doren et al. |
| 6,105,108 | A | 8/2000 | Steely, Jr. et al. |
| 6,108,737 | A | 8/2000 | Sharma et al. |
| 6,108,752 | A | 8/2000 | Van Doren et al. |
| 6,125,429 | A | 9/2000 | Goodwin et al. |
| 6,154,816 | A | 11/2000 | Steely et al. |
| 6,202,126 | B1 | 3/2001 | Van Doren et al. |
| 6,249,520 | B1 | 6/2001 | Steely, Jr. et al. |

OTHER PUBLICATIONS

Jouppi, N., Improving Direct-Mapped Cache Performance by the Addition of a Small Fully-Associative Cache and Prefetch Buffers, (c) 1990 IEEE, pp. 364-373.

Agarwal, A., Simoni, R., Hennesy, J. and Horowitz, M., An Evaluation of Directory Schemes for Cache Coherence, (c)1988 IEEE, pp. 353-362.

Papapanaroos, M. and Patel, J., A Low-Overhead Coherence Solution for Multiprocessors with Private Cache Memories, (c) 1984 IEEE, pp. 284-290.

UltraSPARC Ultra Port Architecture (UPA): The New-Media System Architecture, http://www.sun.com/processors/whitepapers/wp95-023.html, Copyright 1994-2002 Sun Microsystems, pp. 1-4.

Porting OpenVMS Applications to Intel Itanium Architecture, Compaq Conputer Corporation, Apr. 2002, pp. 1-17.

Adve, S., Hill, M., Miller, B. and Nester, R., Detecting Data Races on Weak Memory Systems, (c) 1991 ACM, pp. 234-243.

Gharachorloo, K., Sharma, M., Steely, S. and Van Doren, S., Architecture and Design of AlphaServer GS320, Nov. 2000, pp. 1-12.

IEEE Standard for Scalable Coherent Interface (SCI), (c) 1993 IEEE, pp. Table of Contents, 30-34 and 141-188.

Scales, D. and Gharachorloo, K., Design and Performance of the Shasta Distributed Shared Memory Protocol, XP-000755264, Jul. 7, 1997, pp. 245-252.

Scales, D., Gharachorloo, K. and Thekkath, C., Shasta: A Low Overhead, Software-Only Approach for Supporting Fine-Grain Shared Memory, XP-002173083, Jan. 10, 1996, pp. 174-185.

Scales, D. and Gharachorloo, K., Towards Transparent and Efficient Software Distributed Shared Memory, XP-000771029, Dec. 1997, pp. 157-169.

Scales, D., Gharachorloo, K. and Aggarwal, A., Fine-Grain Software Distributed Shared Memory on SMP Clusters, WRL Research Report 97/3, Feb. 1997, pp. i and 1-28.

* cited by examiner

SYSTEM AND METHOD ENABLING EFFICIENT CACHE LINE REUSE IN A COMPUTER SYSTEM

BACKGROUND OF THE INVENTION

1. Field of the Invention

The present invention relates to computer systems and, more specifically, to cache coherent computer systems.

2. Background Information

A computer system typically comprises one or more processors linked to a main memory by a bus or other interconnect. In most computer systems, main memory organizes the instructions and data being stored into units typically referred to as "blocks" each of which is separately addressable and may be of a fixed size. Instructions and data are typically moved about the computer system in terms of one or more blocks.

Ordinarily, a processor will retrieve data, e.g., one or more blocks, from main memory, perform some operation on it, and eventually return the results back to main memory. Retrieving data from main memory and providing it to a processor can take significant time especially in terms of the high operating speeds of today's processors. To reduce such latencies as well as to reduce the number of times a processor must access main memory, modern processors and/or processor chipsets include one or more cache memories or caches. A cache is a small, fast memory module located in close proximity to the processor. Many caches are static random access memories (SRAMs), which are faster, but more expensive, than dynamic random access memories (DRAMs), which are often used for main memory. The cache is used to store information, e.g., data or instructions, which the processor is currently using or is likely to use in the near future.

Most caches are organized as a series of lines, and each cache line is typically sized to hold one memory block. The particular cache line at which a received memory block is to be placed is determined by the manner in which the cache is organized. There are basically three different categories of cache organization. If a received memory block can be stored at any line of the cache, the cache is said to be "fully associative". If each memory block can only be placed in a single, pre-defined cache line, the cache is said to be "direct mapped". If a received memory block can only be placed within a restricted set of cache lines, the cache is said to be "set associative".

For each cache line, a tag is provided that contains the memory address of the block stored at that cache line. The tag also stores the state of the cache line typically through one or more flags or state bits. In particular, a valid bit indicates whether the entry contains a valid address, while a dirty bit indicates whether the block is dirty, i.e., modified while in the cache, or clean, i.e., not modified.

In addition, there are two basic types of caches: "write-through" and "write-back". With a write-through cache, whenever a processor modifies or updates a piece of data in the processor's cache, main memory's copy of that data is automatically updated. This is accomplished by having the processor write the data back to memory whenever the data is modified or updated. A write-back cache, in contrast, does not automatically send modified or updated data to main memory. Instead, the updated data remains in the cache until some more convenient time, e.g., when the processor is idle, at which point the modified data is written back to memory. The utilization of write-back caches typically improves system performance. In some systems, a write-back or victim buffer is provided in addition to the cache. "Victim data" refers to modified data that is being removed from the processor's cache in order to make room for new data received at the processor. Typically, the data selected for removal from the cache is data the processor is no longer using. The victim buffer stores this modified data which is waiting to be written back to main memory. Modified data in the victim buffer is eventually "victimized", i.e., written back to main memory, typically at some convenient time.

Symmetrical Multiprocessor (SMP) Systems

Multiprocessor computing systems, such as symmetrical multiprocessor (SMP) systems, provide a computer environment in which software applications may run on a plurality of processors using a single address space or shared memory abstraction. In a shared memory system, each processor can access any data item without a programmer having to worry about where the data is or how to obtain its value. This frees the programmer to focus on program development rather than on managing partitioned data sets and communicating values.

Cache Coherency

Because more than one processor of the SMP system may request a copy of the same memory block from main memory, cache coherency protocols have been developed to ensure that no processor relies on a memory block that has become stale, typically due to a modification or update performed to the block by some other processor. Many cache coherency protocols associate a state with each cache line. A given memory block, for example, may be in a shared state in which copies of the block may be present in the caches associated with multiple processors. When a memory block is in the shared state, a processor may read from, but not write to, the respective block. To support write operations, a memory block may be in an exclusive state. In this case, the block is owned by a single processor which may write to the cache line. When the processor updates or modifies the block, its copy becomes the most up-to-date version, while corresponding copies of the block at main memory and/or other processor caches become stale.

There are two classes of cache coherency protocols: snooping and directory based. With snooping, the caches monitor or snoop all transactions traversing the shared memory bus, looking for transactions that reference a memory block stored at the cache. If such a transaction is detected, the cache updates the status information for its copy of the memory block based on the snooped transaction. With a directory based protocol, the state of each block is kept in a single, centralized location in the system, called a directory. The directory filters each request so that only those caches that are interested in the specified memory block, i.e., those caches having a copy of the block, need respond. A directory also maintains state for every coherent memory block in the system even though in most cases the actual number of blocks that are cached is quite small compared to the total size of memory.

In some computer systems, a duplicate copy of the cache tag information that is being maintained at each processor is utilized in place of the directory. The Duplicate Tag store (DTAG) has a section for each processor. The coherence information that must be maintained by the DTAG is bounded by the total cache size of all processors. The overhead required by a DTAG can thus be smaller than that required by a directory which, as mentioned above, maintains coherence for every memory block in the system. All sections of the DTAG are accessed for each memory reference operation issued in the computer system. In other words, the DTAG for each processor is searched to determine whether any processor has a copy of the memory block specified in the memory reference operation. Specifically, a search is made to determine whether one or more processors have a copy of the specified block. The results from these accesses to the DTAG are used to determine the appropriate response to the memory reference operation, including a next state of the DTAG. The responses are then disseminated to the appropriate system components.

For example, if the DTAG reveals that the block targeted by the memory reference operation is held by a processor in the dirty state, the memory reference operation is forwarded to the identified processor which, in turn, satisfies the operation by sending a copy of the specified block from its cache to the component that issued the memory reference operation. If no processor has a copy of the specified block in the dirty state, then the version of the block at main memory is considered up-to-date, and memory satisfies the memory reference operation by sending a copy of the block directly from memory.

When a processor is finished with a memory block that is in the dirty state, the processor writes the modified block from its cache back to main memory. To write-back data, a processor typically performs an atomic read-modify-write operation. More specifically, the processor first reads the contents of the DTAG to confirm that the respective DTAG entry also reflects that the processor has a dirty copy of the memory block. If so, the processor writes the modified data back to memory and invalidates the DTAG entry.

After issuing the write-back, the processor will typically want to re-use the cache line to store a different memory block. In this case, the processor will issue a memory reference operation specifying the new block. The computer system, however, must prevent the memory reference operation from reaching (and modifying the state of) the DTAG ahead of the write-back. If the memory reference operation is processed at the DTAG first, the DTAG entry for the memory block being written back will be replaced with the tag and state information corresponding to the new block. Should another processor request a copy of the memory block being written back, a search of the DTAG would reveal no processor having a dirty copy of the block. Main memory would erroneously conclude that its copy of the memory block is current and send a copy to the processor issuing the request when, in fact, the write-back containing the most up-to-date copy is in flight.

Several approaches have been developed to avoid this problem. First, system designers have imposed a requirement that a processor, upon writing a memory block back to main memory, wait to receive an acknowledgement from memory that the write back completed before issuing a new request that would reuse the cache line victimized by the write-back. By delaying the subsequent memory reference operation until the write-back is acknowledged, the DTAG is kept up-to-date. This solution, however, delays the processor's acquisition of the new memory block while it waits for the acknowledgement. Delays such as these can reduce the computer system's performance. To minimize the performance penalty, some systems employ associative caches and victimize non-dirty memory blocks first to make room for new blocks. Associative caches, however, are more expensive and typically smaller than non-associative, mapped caches. Furthermore, a policy that victimizes non-dirty blocks more often than dirty blocks reduces the effectiveness of the cache.

Another solution is to design the processors to combine the memory reference operation for the new memory block and the write-back into a single operation or command. By combining the two operations into a single command, the system ensures that the request for the new block is never received ahead of the write-back. This solution, however, imposes requirements and complexities on the processor. Not all processors, moreover, support such pairing of memory reference operations with write-backs. Yet another approach is to impose ordering on the communication channel(s) between the processors and the main memory. Ordering constraints, however, increase the complexity of the computer system and, in some cases, may not be feasible. Accordingly, a need exists for an efficient mechanism to issue write backs in a computer system.

SUMMARY OF THE INVENTION

Briefly, the present invention relates to a system and method for efficiently performing write backs in a computer system. In the illustrative embodiment, the computer system is a shared memory, multiprocessor computer system, such as a symmetrical multiprocessor (SMP) computer system. The SMP system may comprise one or more nodes, each having a plurality of processors and a portion of shared memory, that are coupled together by an interconnect fabric. The shared memory is configured to store data in terms of memory blocks, and each processor preferably has a cache for storing selected memory blocks being used by the processor. Associated with each cache entry or line is a tag containing the memory address of the block stored at that line and state information reflecting the state of the entry, e.g., valid/invalid and dirty/clean. The shared memory further includes a duplicate copy of the tag information (DTAG) maintained at each processor cache. In accordance with the invention, each section of the DTAG corresponding to a given processor is organized into a primary DTAG region and a secondary DTAG region. For each tag entry at the processor's cache, there is a duplicate entry within each region of the respective DTAG section. Each DTAG entry, moreover, has a tag field for maintaining the address of the memory block stored at the respective cache line, and state information for maintaining the state of the block at the respective cache line. As the processors issue memory reference operations, the primary DTAG regions of the respective DTAG sections are updated to reflect the address and state of the memory blocks stored at the processor caches.

When a processor victimizes a dirty block from its cache, the processor issues a write back command to main memory containing the modified block. The processor may also issue a memory reference operation for a new memory block to be stored at the same cache line that contained the dirty block being written back to memory. When the memory reference operation for the new memory block is received at main memory, the contents of the matching DTAG entry are checked. Specifically, if the primary DTAG region contains a valid address that is in the dirty state, memory concludes that a write back must be in flight. In this case, the existing DTAG entry for the valid and dirty address is copied from the primary region into the secondary region. Then, the tag and state information for the new request is entered into the primary DTAG region.

Pending receipt of the write back of the dirty memory block at main memory, subsequent requests result in searches being made of both the primary and secondary DTAG regions. If a memory reference operation matches an entry in the secondary DTAG region that is both valid and dirty, the memory reference operation is forwarded to the identified processor rather than being satisfied from main memory, thereby ensuring data coherence. When the write back is finally received at main memory, the dirty memory block is copied into memory and the DTAG entry of the secondary DTAG region is invalidated. With the DTAG entry of the secondary DTAG region invalidated, subsequent requests for the memory block are satisfied from main memory.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
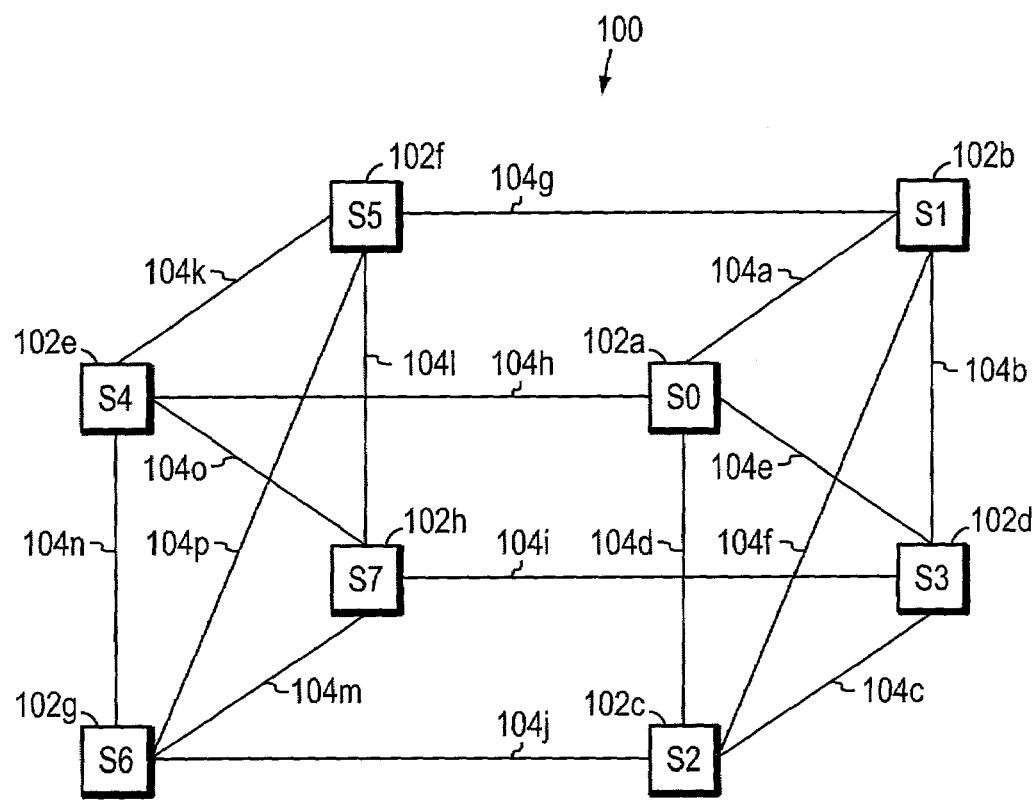
FIG. 1 is a highly schematic functional block diagram of a multi-processor node.

FIG. 1 is a highly schematic illustration of a preferred multiprocessor node 100 for use with the present invention. The node 100 comprises a plurality of, e.g., eight, sockets, S0–S7, which are designated by reference numerals 102a–h. The eight sockets 102a–h are logically located in three-dimensional space at the corners of a cube, and are interconnected by a plurality of inter-processor links 104a–p. Thus, each socket can communicate with any other socket of the node 100. In the illustrative embodiment, sockets forming two opposing sides of the node 100 are fully interconnected, while the two sides are connected only along the edges of the cube. That is, sockets S0–S3, which form one side of the cube, and S4–S7, which form the opposing side of the cube, are fully interconnected with each other, while the two opposing sides are connected by four inter-socket links 104g–j. As described herein, each socket includes one or more processors and has or is coupled to two main memory subsystems.

Figure 2:
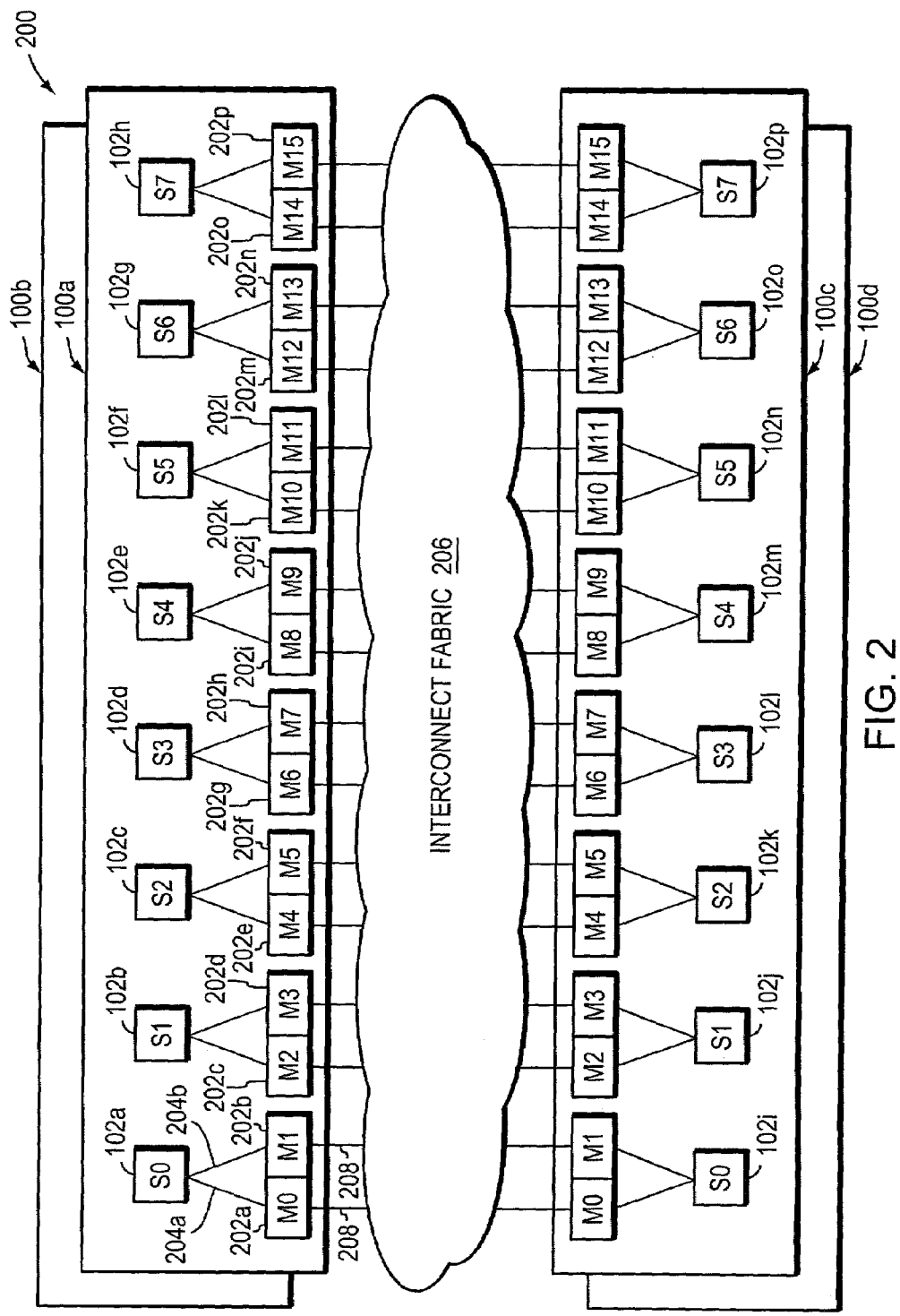
FIG. 2 is a highly schematic functional block diagram of a symmetrical multiprocessor (SMP) computer system formed from a plurality of multi-processor nodes.

FIG. 2 is a highly schematic illustration of a symmetrical multiprocessing (SMP) computer system 200 formed from a plurality of nodes. In particular system 200 comprises four nodes 100a–d, each of which is similar to node 100 (FIG. 1), although the inter-processor links have been omitted for clarity. As described above, each node, such as nodes 100a and 100c, has eight sockets, such as sockets 102a–h and 102i–p, respectively. Each node also includes a plurality of main memory subsystems. Preferably, each socket is coupled to a pair of memory subsystems, thereby providing sixteen memory subsystems at each node. At node 100a, the sixteen memory subsystems M0–M15 are designated by reference numerals 202a–p, and socket 102a is coupled to its pair of memory subsystems 202a and 202b by corresponding processor/memory links 204a and 204b.

The four nodes 100a–d, moreover, are fully interconnected with each other through an interconnect fabric 206. Specifically, each memory subsystem, such as subsystems 202a and 202b, are connected to the interconnect fabric 206 by fabric links 208. In the preferred embodiment, each memory subsystem at a given node is coupled to its counterpart memory subsystem at the other three nodes. That is, memory subsystem M0 at node 100a is coupled by four fabric links to the M0 memory subsystems at the three other nodes 102b–d, memory subsystem M1 at node 100a is coupled by four fabric links to the M1 memory subsystems at the other three nodes 102b–d, and so on.

Figure 3:
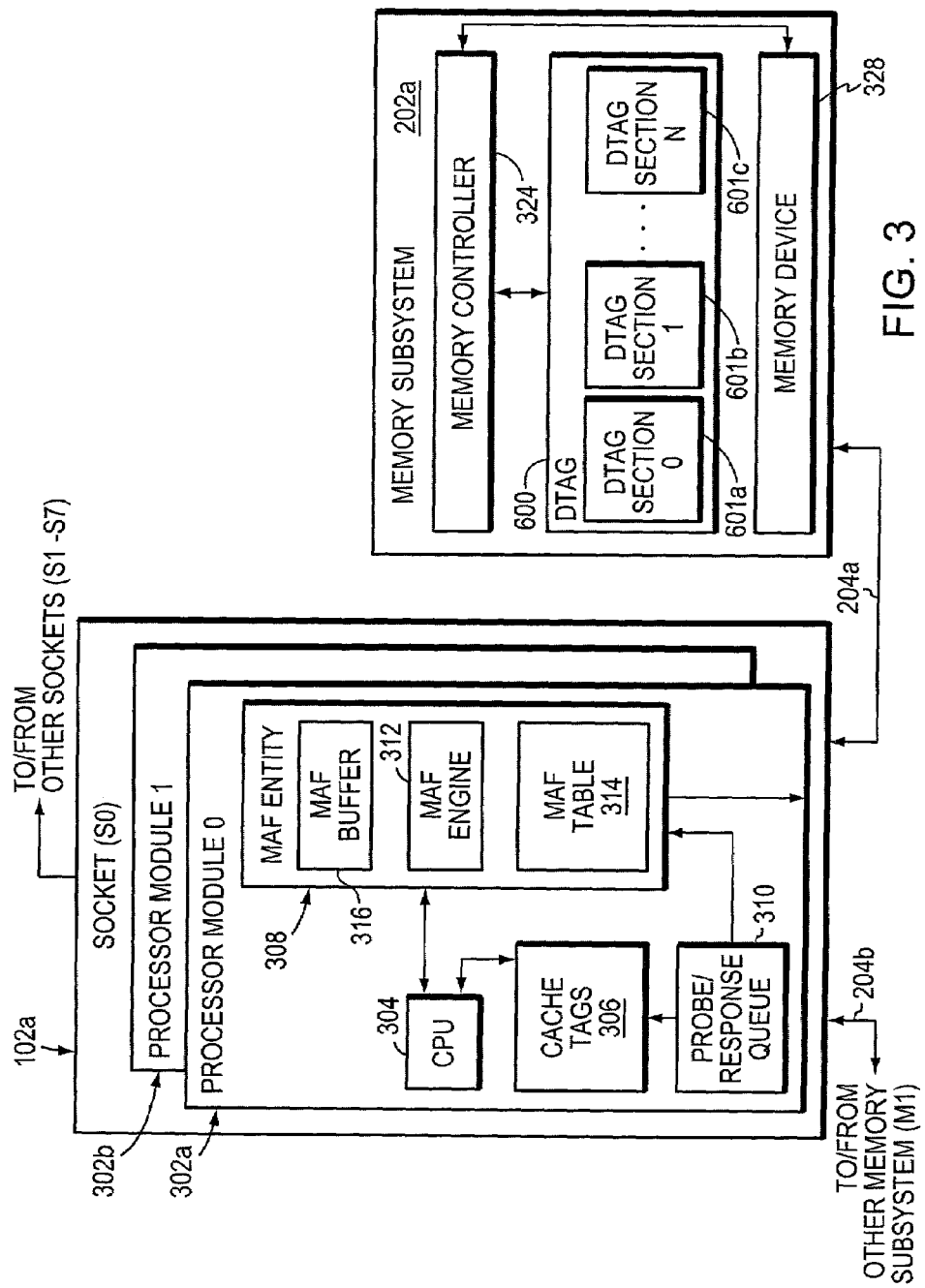
FIG. 3 is a highly schematic block diagram of a processor socket and memory subsystem of the SMP computer system of FIG. 2.

FIG. 3 is a highly schematic illustration of socket (S0) 102a, and one of its associated memory subsystems (M0) 202a. Socket 102a includes two processor modules 302a and 302b. Each processor module, such as module 302a, has a processor or central processing unit (CPU) 304, a cache tags storage device 306, a miss address file (MAF) entity 308 and a probe/response queue 310. The CPU 304 includes one or more processor caches (not shown) at one or more levels that are in close proximity to the CPU for storing data that the CPU 304 is currently using or is likely to use in the near future. The caches are organized into cache lines, and each cache line can store a memory block. Information regarding the status of the memory blocks stored in the processor cache(s), such as the address and validity of the block, is maintained in the cache tags storage device 306, as described below. Device 306 may also store information regarding memory blocks stored at processor registers.

The MAF entity 308, which keeps track of outstanding commands, such as memory reference requests, issued to the system for memory blocks not presently in the cache, has a MAF engine 312, a MAF table 314, a MAF buffer 316 and one or more state machine engines (not shown). The MAF buffer 316 may be used to temporarily store memory blocks received in response to the memory reference requests issued by the CPU 304, and awaiting loading into a cache line or processor register.

Processor module 302b similarly includes a CPU, a cache tags storage device, a MAF entity and a probe/response queue. Socket (S0) 102a is coupled to the other sockets (S1–S7) of node 100a by inter-socket links and to memory subsystems (M0) 202a and (M1) 202b by processor/memory links 204a and 204b, respectively.

It should be understood that each processor module 302 may include other components, such as a write back or victim buffer, a register file, a translation look-aside buffer (TLB), load/store (L/S) queues, etc.

CPU 304 may be and/or include any one of the processors from the Itanium architecture from Intel Corp. of Santa Clara, Calif., such as the Itanium® 1 or Itanium® 2 processors. Nonetheless, those skilled in the art will understand that other processors, such as the Hammer series of 64-bit processors from Advanced Micro Devices, Inc. (AMD) of Sunnyvale, Calif., may also be used.

The memory subsystem (M0) 202a has a memory controller 324, a duplicate tag storage device (DTAG) 600 and one or more memory modules or banks, such as memory device or unit 328. DTAG 600 may be organized into a plurality of sections, such as DTAG sections 601a–c. In the preferred embodiment, there is a separate DTAG section 601 for each processor or CPU 304 of the SMP system 200.

The memory subsystems of nodes 100a–d combine to form the main memory of the SMP system 200 some or all of which may be shared among the processors. Each socket 102, moreover, includes a portion of main memory by virtue of its respective memory subsystems 202. Data stored at the memories 328 of each subsystem 202, moreover, is organized into separately addressable memory blocks that, as mentioned above, are equivalent in size to the amount of data stored in a processor cache line. The memory blocks or cache lines are of uniform, fixed size, and represent the smallest unit of data that can be moved around the SMP system 200. In the preferred embodiment, each cache line contains 128-bytes of data, although other fixed sizes, such as 64-bytes, could be utilized. Each memory address, moreover, maps to and thus identifies one and only one memory block. And, a plurality of address bits, such as the upper three address bits, are preferably employed to identify the "home" memory subsystem of the respective memory block. That is, each memory block, which is separately addressable by the SMP system 200, has a pre-determined home memory subsystem that does not change. Each DTAG 600, moreover, maintains address and state for the memory blocks for which its memory subsystem is the home memory. In other words, rather than having a single, centralized DTAG, the SMP system 200 has DTAGs distributed across all of the memory subsystems.

Memory unit 328 may be and/or may include one or more conventional or commercially available memory structures, such as dynamic random access memory (DRAM), synchronous DRAM (SDRAM), double data rate SDRAM (DDR-SDRAM) or Rambus DRAM (RDRAM) memory devices, among others.

It should also be understood that each socket 102 may further include one or more input/output (I/O) subsystems (not shown), such as an I/O bridge, that connects one or more I/O devices or peripherals to the SMP system 200. The I/O subsystems, moreover, may have their own private caches for buffering data, and the I/O devices may be granted access to some or all of the SMP system's main memory through the I/O subsystems. The processors and I/O subsystems may be referred to as data processing entities as they are both configured to issue requests for memory blocks.

It should further be understood that to the extent the SMP system 200 includes other components having private caches, such as I/O subsystems, a DTAG section for each of these other components may also be provided.

Although the DTAG 600 is shown separate from the memory device 328, those skilled in the art will recognize that the DTAG 600 may be disposed, e.g., stored, within the memory device 328.

Figure 4:
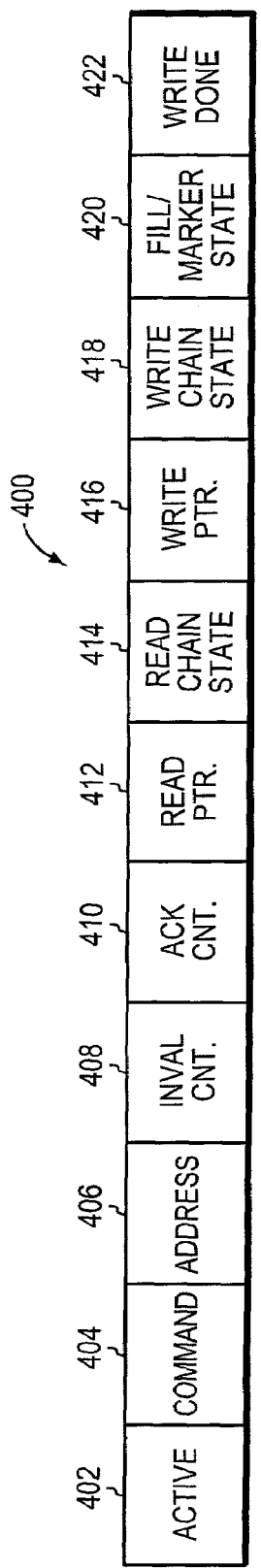
FIG. 4 is a highly schematic block diagram of a miss address file (MAF) entry.

The MAF table 314 is organized at least logically as a table or array having a plurality of rows and columns whose intersections define cells for storing information. FIG. 4 is a highly schematic block diagram of an exemplary row or entry 400 of MAF table 314 (FIG. 3). Entry 400 has a plurality of fields including a 1-bit active field or flag 402, which indicates whether the respective entry 400 is active or inactive, i.e., whether the outstanding request represented by entry 400 is complete or not. A request that is not yet complete is considered active. Entry 400 further includes a command field 404 that specifies the particular command that is outstanding, and an address field 406 that specifies the memory address corresponding to the command. Entry 400 additionally includes an invalid count (Inval Cnt.) field 408, an acknowledgement count (Ack Cnt.) field 410, a read pointer (ptr.) field 412, a read chain state field 414, a write pointer field 416, a write chain state field 418, a Fill/Marker state field 420 and a write-done field 422. The state machines of MAF entity 308 can transition a respective MAF entry 400 among a plurality of states.

Figure 5:
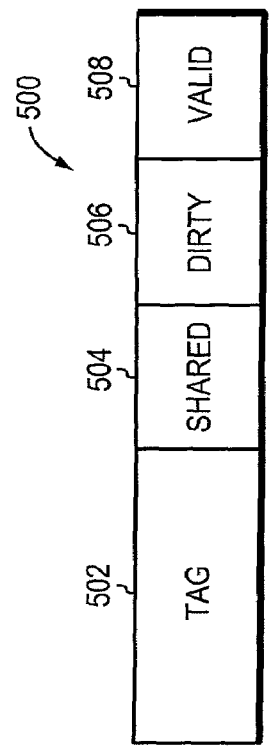
FIG. 5 is a highly schematic block diagram of a cache tag entry.

The cache tags storage device 306 (FIG. 3) is also organized at least logically as a table or array having a plurality of rows and columns whose intersections define cells for storing information. FIG. 5 is a highly schematic block diagram of an exemplary row or entry 500 of the cache tags storage device 306. As mentioned above, each entry of the cache tags storage device 306, including entry 500, corresponds to a particular cache line defined at the processor's cache(s). Cache tag entry 500 includes a tag field 502 that specifies the memory address of the memory block stored at the respective cache line, and a series of status flags or fields, including a shared flag 504, a dirty flag 506 and a valid flag 508. The valid flag 508 or bit indicates whether the respective cache line has a copy of valid data in it, e.g., whether the data is coherent with the latest version of the block. The shared flag 504 or bit indicates whether more than one processor cache in the SMP system has a copy of the block. The dirty flag 506 or bit indicates whether the processor has exclusive access to the cache line and can thus modify or change it to produce a more up-to-date version than the one stored at main memory.

In the illustrative embodiment, the dirty flag 506 is asserted at the time a cache line is filled with a memory block to which the processor has write access. The shared flag 504 is asserted in response to a processor receiving a snoop request for read access to a memory block to which the processor has write access. Upon assertion of the shared flag, the processor is preferably precluded from making further modifications or changes to the memory block.

Figure 6:
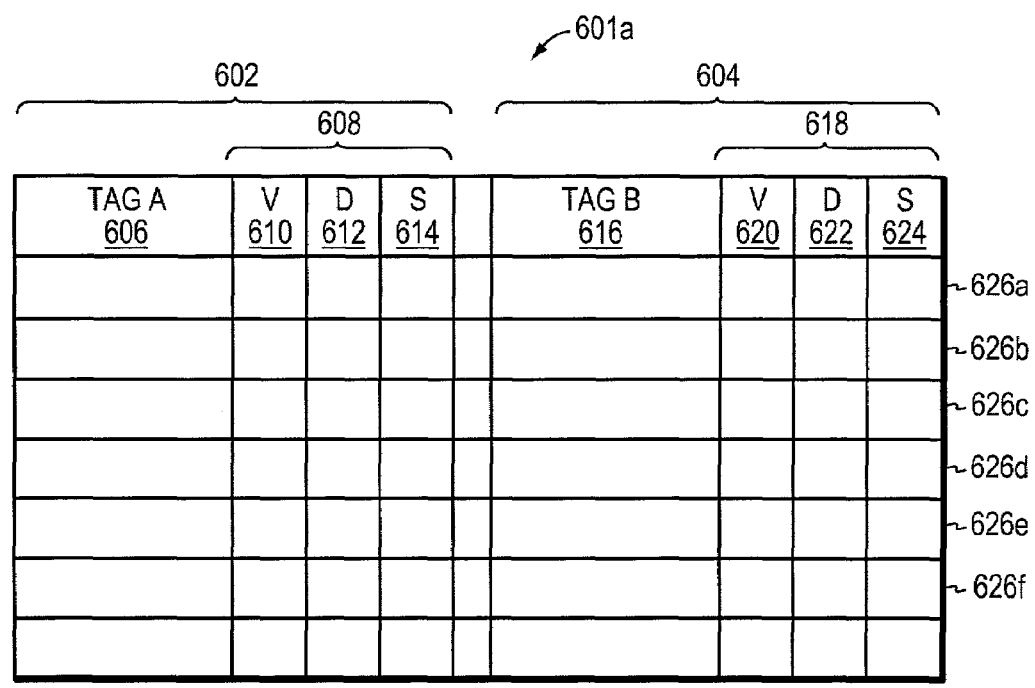
FIG. 6 is a highly schematic illustration of a duplicate tag (DTAG) structure in accordance with the present invention.

FIG. 6 is a highly schematic illustration of a DTAG section, such as DTAG section 601a. In accordance with the present invention, DTAG section 601 a is specifically configured to include a plurality of regions, such as a primary region 602 and a secondary region 604. Each region 602, 604, moreover, is organized, at least logically, as a table or array having a plurality of columns and rows whose intersections define cells or records for storing values. In particular, primary region 602 has a tag column (Tag A) 606 and a state region 608 that may include a valid column 610, a dirty column 612 and a shared column 614. The secondary region 604 similarly includes a tag column (Tag B) 616 and a state region 618 that may include a valid column 620, a dirty column 622 and a shared column 624. Spanning both regions 602, 604 of the DTAG section 601 a are a plurality of rows 626a–f. Each row 626 corresponds to an entry of the cache tag storage device 306 at the associated processor, and thus to a particular cache line.

In the illustrative embodiment, the processors and memory subsystems of the SMP 200 system cooperate to execute a write-invalidate, ownership-based cache coherency protocol. "Write-invalidate" implies that when a processor wishes to modify a cache line, it causes copies of the cache line that may be located in other processors' caches to be invalidated, rather than updating them with the new value. "Ownership-based" implies there is always an identifiable owner for a cache line, whether it is memory or one of the processors of the SMP system 200. The owner of a cache line, moreover, is responsible for supplying the most up-to-date value upon request. A processor may own a cache line "exclusively" or "shared". If a processor has exclusive ownership over a cache line, it may modify or update the cache line without informing the system. Otherwise, it must inform the system and potentially invalidate copies located in other processors' caches.

Virtual Channels

Memory reference operations, such as reads, from a processor are preferably executed by the SMP system 200 through a series of steps where each step involves the exchange of a particular command among the processors and memory subsystems. The SMP system 200 avoids deadlock through the creation of a plurality of channels. Preferably, the channels share physical resources and are thus "virtual" channels. Each virtual channel, moreover, is assigned a specific priority relative to the other virtual channels so that, by appropriately assigning the different types of commands to different virtual channels, flow dependence can also be eliminated. In general, commands corresponding to later steps in a given series are assigned to higher priority virtual channels than the commands corresponding to earlier steps.

In the illustrative embodiment, the SMP system 200 maps commands into at least three (3) virtual channels that are preferably implemented through the use of queues. A Q0 virtual channel carries processor command request packets for memory space read and write transactions. A Q1 virtual channel accommodates command probe packets directed responsive to Q0 requests. A Q2 virtual channel carries command response packets that are responsive to Q0 requests.

A suitable mechanism for implementing virtual channels in a large SMP system is described in U.S. Pat. No. 6,014,690, issued Jan. 11, 2000 for EMPLOYING MULTIPLE CHANNELS FOR DEADLOCK AVOIDANCE IN A CACHE COHERENCY PROTOCOL, which is hereby incorporated by reference in its entirety.

Those skilled in the art will recognize that other and/or additional virtual channels could be defined. The virtual channels, moreover, can be configured to carry other types of command packets. The Q0 virtual channel, for example, may also accommodate processor command request packets for programmed input/output (PIO) read and write transactions, including control status register (CSR) transactions, to input/output (I/O) address to space.

Operation of Memory Subsystems

Each memory subsystem 202 preferably includes a built-in, self test (BIST) engine (not shown) that is used during initialization of the subsystem. The BIST engine initializes the contents of the memory device 422, and the DTAGs 600 by setting them to predetermined values, e.g., null, as one of the final steps of the self test. It should be understood that firmware, rather than or in addition to a BIST engine, may be used for initialization purposes.

As data is brought into the SMP system 300, it is loaded into the memory devices 328 of the memory subsystems 302 in units of memory blocks or cache lines. As each memory block is stored at a memory subsystem 302, the memory controller 324 computes a first error correction code (ECC) value for the block which is stored along with the cache line as described above. Data may be brought into the memory subsystems 302 from any number of sources, such as floppy disk drives, hard disk drives, tape drives, optical or magneto-optical drives, scanners, sound cards, transducers, etc.

Read Command

Suppose a processor, e.g., processor P0, of the SMP system 300 wishes to read a memory block that is not present in its cache. Processor P0 preferably issues a Read command on the Q0 virtual channel specifying the address of the desired cache line. Processor P0 also directs MAF engine 312 to create an entry in the MAF table 314 for this request. MAF engine 312 asserts the active flag 402, loads the command field 404 with an operation code (opcode) indicating that the outstanding request is a Read command and enters the address of the cache line in the address field 406. MAF engine 312 transitions the Fill/Marker state associated with the entry and reflected in field 420 from the idle state to the active state. The remaining fields of the MAF table entry 400 may be de-asserted. The SMP system 200 routes the Read command from processor P0 to the home memory subsystem for the specified memory block, e.g., subsystem 202*a*.

At memory subsystem 202*a*, the memory controller 324 accesses, e.g. searches, DTAG 600 to determine the current state of the memory block specified in the Read command. That is, the memory controller 324 searches each DTAG section 601 looking for any tag entries matching the address specified by the Read command. Assuming the search of the DTAG 600 indicates that no processor has a copy of the memory block in the dirty state, the memory controller 324 concludes that the version stored at memory device 328 is the most up-to-date. Accordingly, the memory controller 324 responds to the Read command by sending processor P0 a copy of the memory block from memory device 328.

Specifically, the memory controller 328 issues a Fill command on the Q2 virtual channel that includes the address and data of the requested memory block. The memory controller 328 also updates the DTAG section 601 corresponding to P0. Specifically, the memory controller 328 identifies the DTAG entry, e.g., entry 626*b*, for the cache line at which the memory block will be stored upon receipt at P0. In the preferred embodiment, the processor caches are direct-mapped caches. Accordingly, each memory block can be stored at only one cache line. The memory controller 324 enters the address of the memory block specified by the Read command in the tag field 606 of the primary region 602 and asserts the valid flag 610. As P0 requested read or shared access to the memory block, the memory controller does not assert the dirty flag 612.

It should be understood that, when a memory block is read out of a memory device 328, the memory controller 324 preferably checks parity information, e.g., a parity bit, to determine whether the retrieved data has been corrupted. If so, the memory controller 324 utilizes the previously computed ECC value to recover the data. The recovered data is then sent to the requesting entity. The recovered data may also be loaded back into the memory device 328, overwriting the corrupted data.

In some SMP systems that use ordered Q1 commands, a fill marker mechanism is employed to inform a processor that its request, such as a Read command, has accessed the home memory's DTAG, and that the requested data is in the process of being returned to the processor. Typically, the fill marker mechanism is implemented through the issuance of a separate Marker command by the memory subsystem to the processor upon access to the DTAG. In the illustrative embodiment, memory controller 324 does not send a separate Marker command message in response to Read commands. Nonetheless, those skilled in the art will recognize that a fill maker mechanism could be implemented by SMP system 200.

At processor P0, the Fill command is received at the probe/response queue 310, and the MAF engine 312 searches the MAF table 314 for an entry corresponding to the address contained in the received Fill command. The MAF engine 312 transitions the state reflected in the Fill/Marker state field 420 from the active state to the idle state, and the matching entry is rendered inactive by de-asserting the active flag 402. The data included with the Fill command is loaded into P0's cache and the respective entry 500 of the cache tags storage device 306 is up-dated. Specifically, the tag field 502 is loaded with the address of the received cache line, and the valid flag 504 is asserted.

ReadMod Command

Suppose that, instead of just needing to read a memory block, processor P0 wishes to obtain write access over a block that is not present in its cache. In this case, P0 preferably issues a Read_Modify (ReadMod) command on the Q0 virtual channel specifying the address of the desired memory block. P0 also directs MAF engine 312 to establish an entry in the MAF table 314 for the outstanding ReadMod command. MAF engine 312 asserts the active flag 402, loads the command field 404 with an opcode indicative of a ReadMod command, and enters the address of the cache line in the address field 406. In addition, MAF engine 312 transitions the Fill/Marker state as reflected in field 420 from the idle state to the active state. The remaining fields of the MAF table entry 400 may be de-asserted. System 200 routes the ReadMod command from processor P0 to the cache line's home memory subsystem 202a.

At memory subsystem 202a, the memory controller 324 accesses each of the DTAG section 601 to determine the state of the specified memory block. Suppose the search of the DTAG 600 reveals that no other processor has a copy (dirty or clean) of the specified memory block. The memory controller 324 thus concludes that the version stored at its memory device 328 is the most up-to-date. Accordingly, the memory controller 324 responds to the ReadMod command by sending processor P0 a copy of the memory block from its memory device 328.

Specifically, the memory controller 324 issues a Fill_Modify (FillMod) command on the Q2 virtual channel that includes the address and the requested memory block. The memory controller 324 also updates the DTAG region 601 associated with P0. Specifically, the memory controller 324 identifies the DTAG entry, e.g., entry 626d, corresponding to the cache line into which the memory block will be stored at P0. The memory controller 324 then enters the address of the memory block in the tag field 606 of the primary region 602 and asserts both the valid and dirty flags 610 and 612.

If, at the time the ReadMod command is received at the memory controller 324, the search of the DTAG 600 indicates that one or more entities have a shared, e.g., clean, copy of the block, the memory controller 324 issues an Invalidate (Inval) command on the Q1 virtual channel to each such entity directing them to invalidate their copies of the block. Supposing there were two such entities, the memory controller 324 would also have set an invalid count within the FillMod command to two. When the FillMod command is received at P0, the corresponding MAF entry is located and the Inval Count field 408 is set to two as specified by the FillMod command. The memory controller 324 also accesses the DTAG entries for these entities and de-asserts the valid flag 610.

In response to the Inval commands from the memory controller 324, the other entities invalidate their copies of the block and send Invalid_Acknowledgement (IAck) commands on the Q2 virtual channel to P0. In response to each IAck command, P0 increments by one the Ack Count field 410 of the respective MAF entry 400. The MAF engine 312 continuously checks the values of the Inval Count and Ack Count fields 408 and 410. When the two values are the same, indicating that each and every entity that had a shared copy of the cache line has invalidated its copy, P0 considers the cache line to be consistent and available to it for processing.

Suppose, after granting P0 write access over the block, another processor, e.g., processor P1, issues a Read command for the same block. The Read command is routed by the SMP system 200 to the block's home memory subsystem 202a. The memory controller 324 accesses the DTAG 600 and determines that P0 has a valid and dirty copy of the specified memory block. In this case, the memory controller 324 concludes that P0, rather than the memory subsystem itself, has the most up-to-date version of the block. Accordingly, the memory controller 324 issues a snoop, such as a Forwarded_Read (FRead) command, on the Q1 virtual channel to P0. The memory controller 324 also updates the DTAG entry for P0 by asserting the shared flag 614 and updates the DTAG entry for P1 by entering the address of the memory block in the tag field 606 and asserting the valid flag 610. The dirty and shared flags 612 and 614 for P1's DTAG entry are left de-asserted.

P0 responds to the FRead command by sending a copy of the block from its cache to P1 in a FillMod command on the Q2 virtual channel.

ReadMod Command With other Processor as Owner

Suppose a third processor, P2, now issues a ReadMod command for this same memory block. The ReadMod command is routed by the SMP system 200 from processor P2 to the block's home memory subsystem 202a. The memory controller 324 accesses the DTAG 600 and determines that P0 has a valid and dirty copy of the memory block and that P1 has a valid and clean copy of the memory block. Because P0 is considered to have the most up-to-date copy, the memory controller 324 issues a Forwarded_Read_Modify (FReadMod) command on the Q1 channel to P0, and an Inval command on the Q1 channel to P1. In the illustrative embodiment, the FReadMod command also carries an inval count of two. The memory controller 324 also updates the DTAG entries for P0 and P1 by de-asserting the valid flag for both DTAG entries, and updates the DTAG entry for P2 by entering the address of the memory block in the tag field 606 of the primary region and asserting the valid and dirty flags 610 and 612.

In response to the FReadMod command, P0 issues a FillMod command on the Q2 virtual channel to P2 containing the cache line. The FillMod command preferably has an Inval Count of two, reflecting that there are two entities with a copy of the cache line, i.e., P0 and P1. P0 also invalidates its copy of the cache line by de-asserting the cache tag entry's valid flag 608, and sends P2, either individually or as part of the FillMod command, an IAck command on the Q2 channel. In response to the Inval command, P1 also invalidates its copy of the memory block and sends an IAck command to P1. As each IAck command is received at P1, its MAF engine 312 increments the Ack Count field 410 of the corresponding MAF entry 400 by one. When the Inval Count and Ack Count fields 408 and 410 are equal, the cache line is considered to be consistent and may be processed, e.g., read and/or modified, by P2.

Write Back Command

When P2 is finished with the cache line, it writes the cache line back to its home memory subsystem 202a in order to make room in its cache for other cache lines. In the illustrative embodiment, the processor module 302a (FIG. 3) does not include a separate write-back or victim buffer. Instead, a cache line that is being victimized from the processor's cache is written-back to memory directly from the cache. With the prior art solutions, writing a cache line back to memory required an atomic read-modify-write cycle to be performed by the processor. Such read-modify-write cycles require significant time to complete and consume substantial system resources, including bandwidth. They also divert the processor from performing other, possibly more important, tasks. With the present invention, write-backs are performed without having to impose atomic read-modify-write cycles on the computer system and without forcing the processor to wait for acknowledgement before issuing a memory reference operation that re-uses the cache line being victimized.

As shown, the processors 304 and memory subsystems 202 cooperate to execute a generalized low occupancy cache coherency protocol. The protocol is "generalized" in that it can support processors that share memory blocks that are in the dirty state as well as processors that are precluded from sharing memory blocks that are in the dirty state. A dirty-shared processor responds to a snoop read, e.g., a FRead command, identifying a block in the dirty state by sending a copy of the block from its cache to the source of the snoop read. The dirty-shared processor does not, in response to the snoop read, write a copy of the block back to main memory. Accordingly, multiple processors may have a "dirty" copy of a memory block, although only one processor, the owner, can write the block back to main memory. Non-dirty shared processors do not support dirty blocks being held in more than one cache. In particular, if a non-dirty shared processor receives a snoop read identifying a block in the dirty state, the processor typically writes the block back to main memory, thereby requiring the source of snoop read to obtain a copy of the block from memory. Alternatively, the non-dirty shared processor may return the dirty block to main memory but also forward a copy of the block from its cache to the source of the snoop read. As described in co-pending application Ser. No. 10/263,741, filed Oct. 3, 2002 and titled COMPUTER SYSTEM SUPPORTING BOTH DIRTY-SHARED AND NON DIRTY-SHARED DATA PROCESSING ENTITIES, which is hereby incorporated by reference in its entirety, the illustrative cache coherency protocol supports both types of processors.

The protocol is also considered a "low occupancy" protocol, because of the following attributes. First, each command only has to access the DTAG 600 once. Second, DTAG updates are deterministically based on the current directory state and the type of the received command. That is, the resulting state or form of a DTAG entry is solely a function of the current state or form of the entry and the received command. Third, the DTAG 600 neither creates nor requires any transient states or the return of acknowledgements in order to maintain coherency. Accordingly, once the memory controller 324 has updated the appropriate fields of the DTAG 600 and issued the required commands, e.g., ReadMods, Invals, etc., it can immediately process another command for the same memory block even though the previous commands have yet to reach their targets.

In accordance with the preferred embodiment of the present invention, the virtual channels, i.e., the logic, fabric links, and other resources on which the virtual channels are built, must guarantee delivery of all commands within the SMP system 200. The cache coherency protocol assumes that all commands issued in connection with a memory reference operation will be received by their intended targets.

FIGS. 7A–D show an exemplary exchange of commands among a plurality of processors and a memory subsystem illustrating the preferred operation of the present invention. Suppose, for example, that a processor P0 also designated by reference numeral 304a (FIG. 7A) wishes to obtain write access over a memory block, e.g., block X, that is not in P0's cache. P0 issues a ReadMod command 702 for X on the Q0 virtual channel. The SMP system 200 routes the ReadMod command 702 to the home memory subsystem for memory block X, e.g., subsystem 202h. The memory controller 324 searches each DTAG section 601 to determine whether any processor currently has a valid copy of the requested memory block, i.e., block X, in either the dirty or clean states. Assuming no other processors have a valid copy of block X in their caches, the memory controller 324 satisfies the request from P0 by sending it a copy of memory block X taken from memory device 328 in a FillMod command 704 on the Q2 virtual channel.

Figure 7A:
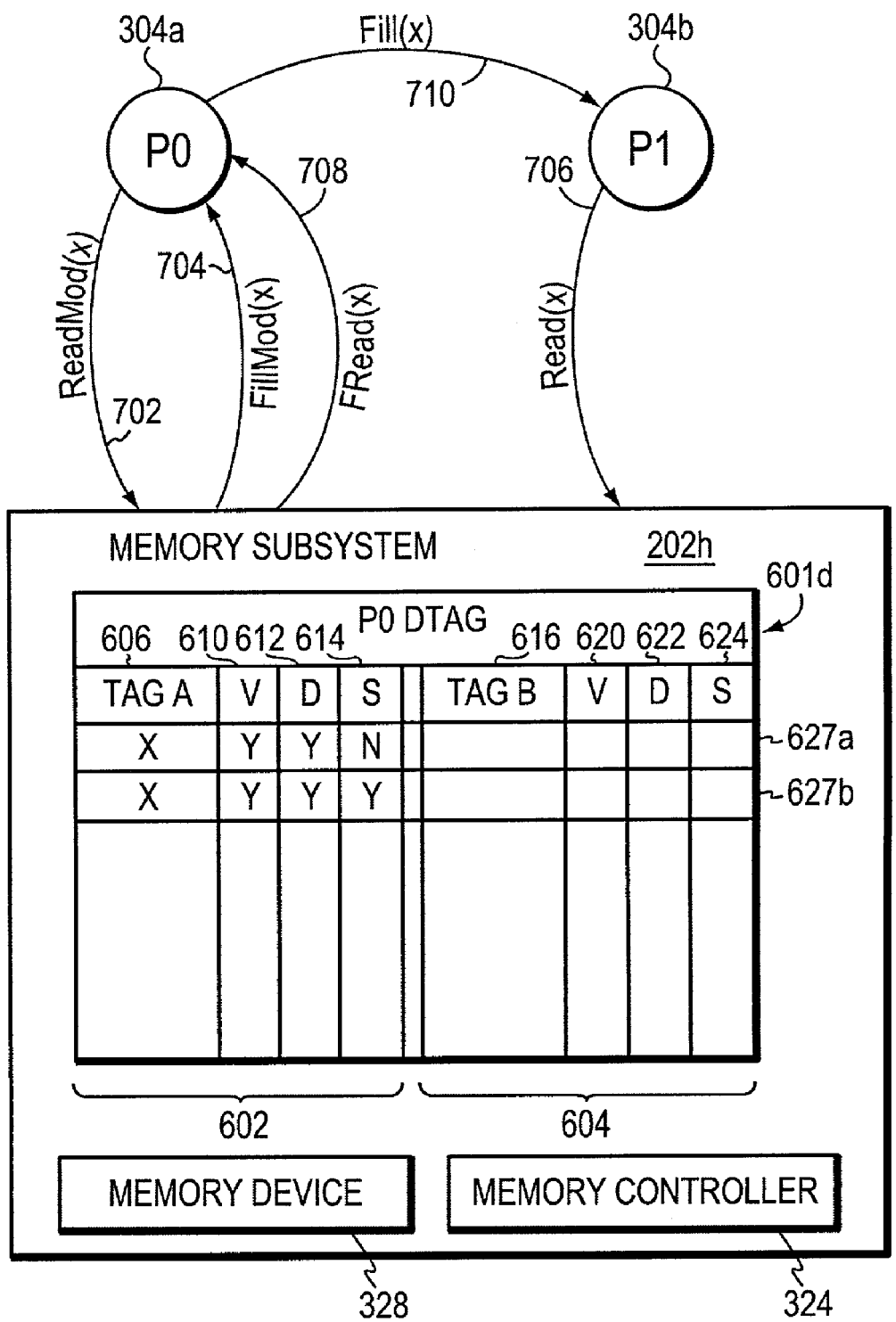
FIGS. 7A–D illustrate an exemplary exchange of command packets among a plurality of processors and a memory subsystem.
Figure 7B:
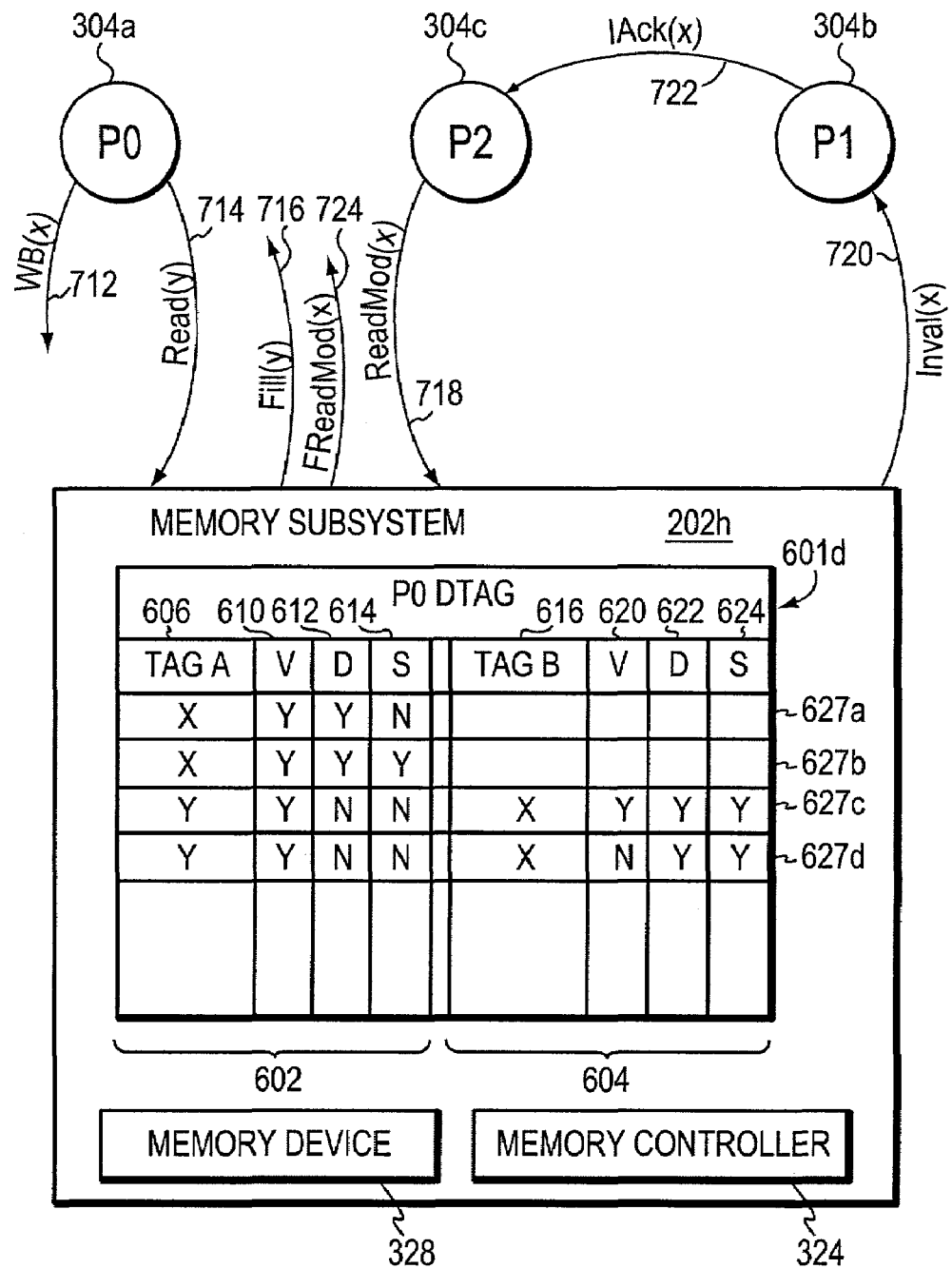
Figure 7C:
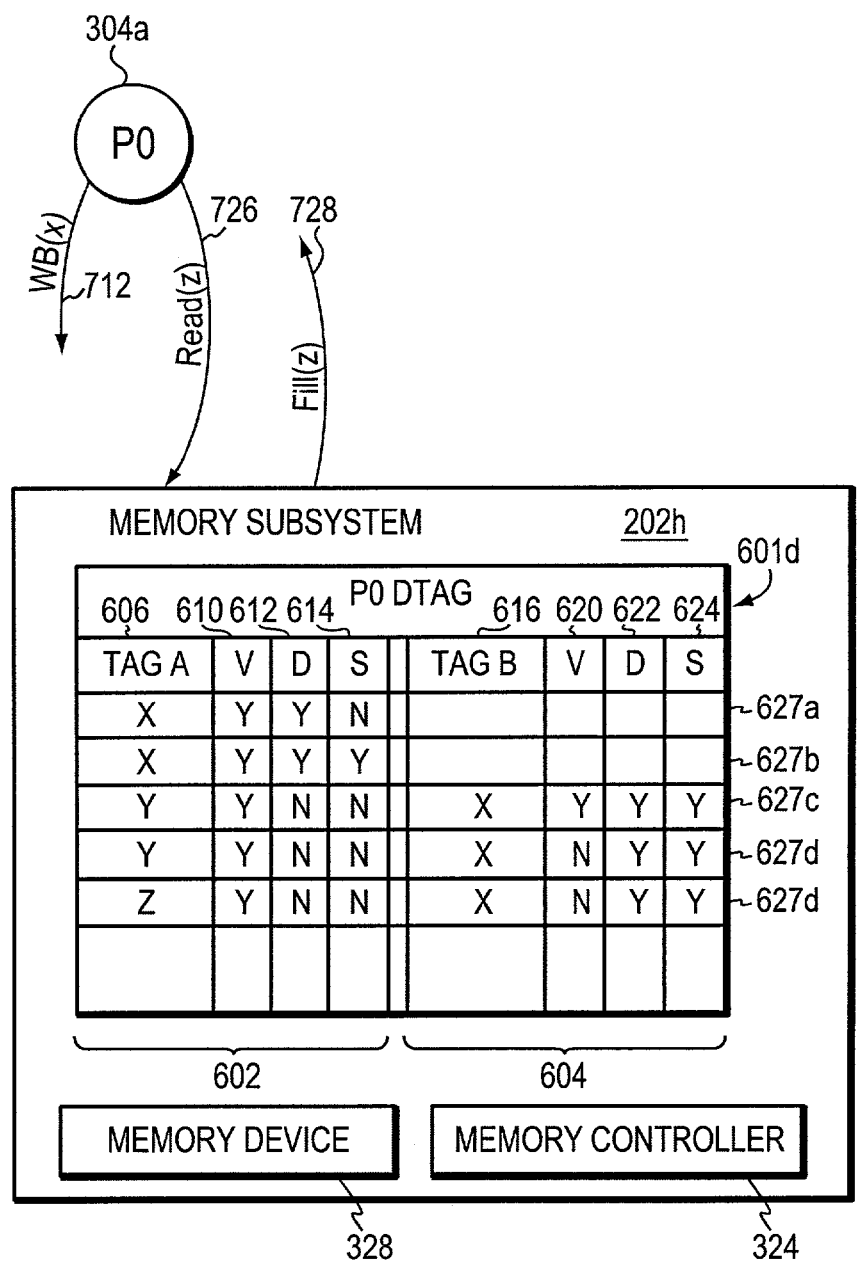

The memory controller 324 also updates the DTAG section established for P0, e.g., DTAG section 601d (FIG. 7A). Specifically, the memory controller 324 identifies the entry, e.g., entry 627a of the DTAG section 601d that corresponds to the cache line at which block X will be stored by P0. In the tag field 606 of the primary region 602, the memory controller 324 enters the block's address, e.g., X. The memory controller 324 also asserts the valid flag 610 and the dirty flag 612, but leaves the shared flag 614 deasserted. The memory controller 324 preferably leaves all of the fields of the secondary region 604 unmodified, e.g., de-asserted.

Suppose another processor P1 also designated by reference numeral 304b issues a Read command 706 for memory block X. The Read command 706 is routed to block X's home memory subsystem 202h which searches the DTAG sections 601 to determine the current state of block X. The search identifies DTAG entry 627a of DTAG section 601d which corresponds to P0. As the dirty flag 612 is asserted, DTAG entry 627a indicates that P0 has a dirty, i.e., write access, copy of memory block X. Accordingly, memory controller 324 responds by issuing a snoop read, such as a FRead command 708, on the Q1 virtual channel to P0. The memory controller 324 also updates the DTAG sections established for P0 and P1. Specifically, at DTAG section 601d which corresponds to P0, the memory controller 324 accesses entry 627a and asserts the shared flag 614 of the primary region 602. The fields of the secondary region 604 are left unmodified. DTAG entry 627b illustrates how entry 627a would appear following the update. At the DTAG section established for P1, the memory controller 324 identifies the entry that corresponds to the cache line at which P1 will store block X. Within this DTAG entry, the memory controller 324 enters the block's address, i.e., X, into the tag field for the primary region. The memory controller 324 also asserts the valid flag, but not the dirty or shared flags. The memory controller 324 leaves the fields of the secondary region of the DTAG entry for P1 unmodified, e.g., de-asserted.

In response to the FRead command 708, P0 issues a Fill command 710 on the Q2 virtual channel to P1 that includes a copy of memory block X taken from P0's cache. P0 also updates its cache tag entry by asserting the shared flag. P0's cache tag entry thus matches the primary region portion of DTAG entry 627b at memory subsystem 202h. When P1 receives the Fill command 710, it fills its cache with the received block and updates its cache tag entry.

Suppose P0 now needs another memory block, e.g., block Y, that is to be stored in the same cache line that is currently holding block X. Because P0's cache tag storage device 306 indicates that P0's copy of block X is in the dirty state, P0 cannot simply overwrite block X with block Y. Instead, P0 must write its modified version of block X back to main memory 202 in order to free up the cache line for use by block Y. P0 thus issues a Write_Back (WB) command 712 (FIG. 7B) that includes the modified version of block X from P0's cache. P0 also de-asserts the valid flag 508 of its cache tag entry 500 that is associated with the cache line at which block X was stored. In accordance with the present invention, upon issuing the WB command 712 for block X, P0 is now free to issue a request for the new block to be stored at the cache line previously holding block X. That is, P0 does not have to wait for an acknowledgement from the home memory subsystem 202h confirming receipt of the WB command 712 before issuing the new request. Additionally, P0 does not have to be configured to pair the WB command 712 for block X with the new request for block Y. Instead, P0 may simply issue a Read command 714 (FIG. 7B) for block Y on the Q0 virtual channel any time after issuing the WB command 712, including immediately after the WB command 712.

As the virtual channels of the SMP system 200 are preferably unordered, the Read command 714 for block Y may reach the home memory subsystem for block Y before or after the WB command 712 reaches home memory subsystem 202h. Suppose further that the home memory subsystem for block Y is also subsystem 202h, and that the Read command 714 for block Y reaches subsystem 202h before (or is at least processed ahead of) the WB command 712 for block X. In response to the Read command 714 for block Y, the memory controller 324 searches the DTAG sections 601 to see if any processor has a copy of block Y in its cache. Suppose that no processor has a copy of block Y in its cache. In this case, the memory controller 324 concludes that the copy of block Y in memory device 328 is up-to-date.

Next, the memory controller 324 accesses the DTAG entry within the DTAG region 601d established for P0 that corresponds to the cache line at P0's cache at which block Y will be stored. As indicated above, block Y is to stored at the same cache line previously used to hold block X, i.e., DTAG entry 627b. The memory controller 324 examines DTAG entry 627b and learns that this cache line already stores a dirty version of block X as indicated by block X's address being in the tag field 606 and the valid and dirty flags 610 and 612 being asserted. The memory controller 324 also notes that block X is being shared with at least one other data processing entity. In this situation, the memory controller 324 concludes that there must be a write back in flight for block X.

According to the present invention, the memory controller 324 utilizes the secondary region 604 of the DTAG section 600d established for P0 to buffer the cache tag information for block X pending receipt of the WB command 712. In particular, the memory controller 324 moves the tag information for block X, which is currently in the primary region of DTAG entry 627b and moves it into the secondary region of entry 627b. That is, the memory controller 324 copies the address of block X from tag field 606 into tag field 616, and the state information from fields 610–614 into fields 620–624. The memory controller 324 then updates the primary region of DTAG entry 627b based on P0's Read command 714 for block Y. Specifically, the memory controller 324 enters block Y's address in the tag field 606 of the primary region 602, asserts the valid flag 610 and leaves the dirty and shared flags of fields 612 and 614 de-asserted. DTAG entry 627c illustrates how entry 627b would appear following these updates. The memory controller 324 then issues a Fill command 716 on the Q2 virtual channel to P0 that includes a copy of block Y taken from memory device 328.

As shown, memory controller 324 has created a single DTAG entry, i.e., entry 627c, which corresponds to a single cache line at P0's cache, that nonetheless stores two different but valid tag values, i.e., X and Y. Accordingly, the memory controller 324 issues a Fill command 716 on the Q2 virtual channel to P0 that includes a copy of block Y taken from memory device 328.

Suppose now that another processor, processor P2 also designated by reference numeral 304c, issues a request for write access to memory block X. In particular, P2 issues a ReadMod command 718 for block X. Suppose further that ReadMod command 718 arrives at home memory subsystem 202h before or is at least processed ahead of WB command 712 for block X. The memory controller 324 searches the DTAG sections to determine whether any processor has a valid copy of block X in their caches. Upon searching the DTAG section for P1, the memory controller 324 determines that P1 has a clean version of block X in its cache. Accordingly, the memory controller 324 issues an Inval command 720 to P1 on the Q1 virtual channel that targets block X. The memory controller 324 also de-asserts the valid flag of the entry within P1's DTAG section for block X. P1 responds to the Inval command 720 by invalidating its cached copy of block X, and by issuing an IAck command 722 to P2 on the Q1 virtual channel confirming P1's invalidation of block X from its cache.

As part of its searching of the DTAG sections for block X, the memory controller 324 also identifies entry 627c of DTAG section 600d established for P0. Specifically, the secondary region 604 of DTAG entry 627c indicates that P0 has a dirty copy of block X in its cache. The primary region 602 of DTAG entry 627c, meanwhile, indicates that a clean copy of block Y is stored at this cache line. In this case, the memory controller 324 concludes that a write back of block X must still be in-flight from P0. In the preferred embodiment, the memory controller issues a FReadMod command 724 to P0 on the Q1 channel targeting block X, rather than entering some transient state for block X which would convert the memory controller 324 into a high occupancy controller. The memory controller 324 also modifies the DTAG entry 627c. Specifically, the memory controller 324 de-asserts the valid flag 620 of entry 627c corresponding to block X, but leaves the dirty flag 622 asserted. That is, the secondary region of DTAG entry 627c that stores P0's cache status for block X is left in the valid state. The shared flag 624 may be left alone or it may be de-asserted. DTAG entry 627d (FIG. 7B) illustrates how entry 627c would appear following these updates.

It should be understood that keeping the dirty flag 622 asserted is all that is required to identify the secondary region 604 as still being active and awaiting a write back. Nonetheless, subsequent memory reference operations, such as Reads or Read-Mods, will be forwarded to P2. Furthermore, subsequent memory reference operations from processors other than P0 will not identify P0 as having a cached copy of the block. So, while the DTAG entry for P0 is in this state, no invalidates will be sent to P0.

The memory controller 324 additionally updates the DTAG section established for P2. That is, at the DTAG entry for the cache line at which P2 will store block X, the memory controller 324 enters block X's address in the tag field 606 of the primary region (assuming the primary region does not already indicate that this cache line is being used to store a dirty value of some other memory block), and asserts the valid flag 610 and the dirty flag 612.

At P0, the FReadMod command 724 will miss on P0's cache because P0 has written block X back to the memory subsystem 202h. This condition, in which a snoop read, e.g., FReadMod command 716, arrives at its intended destination, e.g., P0, only to find that the requested memory block, e.g., block X, is no longer present, is known as a late race condition. Suitable mechanisms for resolving such late races are described in commonly owned, copending U.S. patent application Ser. No. 10/263,836 titled CHANNEL-BASED LATE RACE RESOLUTION MECHANISM FOR A COMPUTER SYSTEM, filed Oct. 3, 2002, and in U.S. patent application Ser. No. 10/263,743 titled RETRY-BASED LATE RACE RESOLUTION MECHANISM FOR A COMPUTER SYSTEM, filed Oct. 3, 2002, both of which are hereby incorporated by reference in their entirety.

Suppose P0 issues a Read command 726 (FIG. 7C) for block Z and that block Z is to be stored at the same cache line previously utilized by blocks X and Y. In the illustrative embodiment, the processors 304 need not issue write backs or victim clean messages for blocks that are in the clean state. Accordingly, P0 can simply issue its Read command 726 for block Z, and upon receipt of block Z overwrite its valid copy of block Y to which P0 has read access. Suppose further that the home memory subsystem for block Z is also subsystem 202h, and that Read command 726 for block Z arrives at memory subsystem 202h (or is at least processed ahead of) WB command 712 for block X. The memory controller 324 searches the DTAG sections 601 to see if any processor has a copy of block Z in its cache. Suppose that no processor has a copy of block Z in its cache. In this case, the memory controller 324 concludes that the copy of block Z in memory device 328 is up-to-date.

Next, the memory controller 324 accesses the DTAG entry within the DTAG region 601d established for P0 that corresponds to the cache line at P0's cache at which block Z will be stored. As indicated above, block Z is to stored at the same cache line previously used to hold blocks X and Y, i.e., DTAG entry 627c. The memory controller 324 examines DTAG entry 627c and learns that this cache line already stores a clean version of block Y as indicated by the contents of the primary region 602, and that a write back is in flight for a dirty version of block X previously stored at this cache line as indicated by the contents of the secondary region 604.

Because block Y is being held by P0 in the read access or shared state, the memory controller 324 preferably updates the primary region 602 of DTAG entry 627c in response to the Read command 726 for block Z overwriting the information entry for block Y. Specifically, the memory controller 324 enters the block' address, i.e., Z, in the tag field 606 of the primary region 602, asserts the valid flag 610 and leaves the dirty and shared flags 612 and 614 de-asserted. The memory controller 324 also does not disturb, e.g., it does not change or modify, the contents of the secondary region which continues to track the in-flight WB command 712. Directory entry 627e illustrates how entry 627d would appear following these updates. The memory controller 324 also issues a Fill command 728 on the Q2 virtual channel that includes a copy of block Z taken from memory device 328. At P0, block Z is stored at P0's cache in the cache entry previously storing block Y. P0 also updates the entry of its cache tag storage device 306 for this cache line accordingly.

This same process would also be used if P0 requested a write access copy of block Z as opposed to a read access copy. That is, the memory controller 324 would enter the new information regarding block Z in the primary region 602 of DTAG entry 627c replacing the information for block Y, although this time the memory controller 324 would also assert the dirty flag 612 to reflect that P0 has write access to block Z.

Suppose memory subsystem 202h receives a Read (or ReadMod) command (not shown) for memory block L from P0, and that the DTAG entry for the cache line at which block L will be stored, indicates that P0 already has a dirty copy of block L. In this case, the memory controller 324 concludes that P0 issued a WB for block L, and then realized that it needed to access block L again (either for read or for write access). In response, the memory controller 324 preferably issues a Retry command to P0. The memory controller 324 does not modify the contents of the DTAG entry for block L. In response to the Retry command, P0 issues another Read (or ReadMod) command for block L. This process is repeated until the write-back of block L reaches the home memory subsystem 202h. When the write back for block L is received at the memory subsystem 202h, the block is entered into memory, and the contents of the secondary region 604 of the DTAG entry, reflecting that P0 has a dirty copy of block L, are invalidated and the dirty flag is de-asserted. The subsequent Read (or ReadMod) command, from P0 for block L can then be serviced from memory device 328.

Figure 7D:
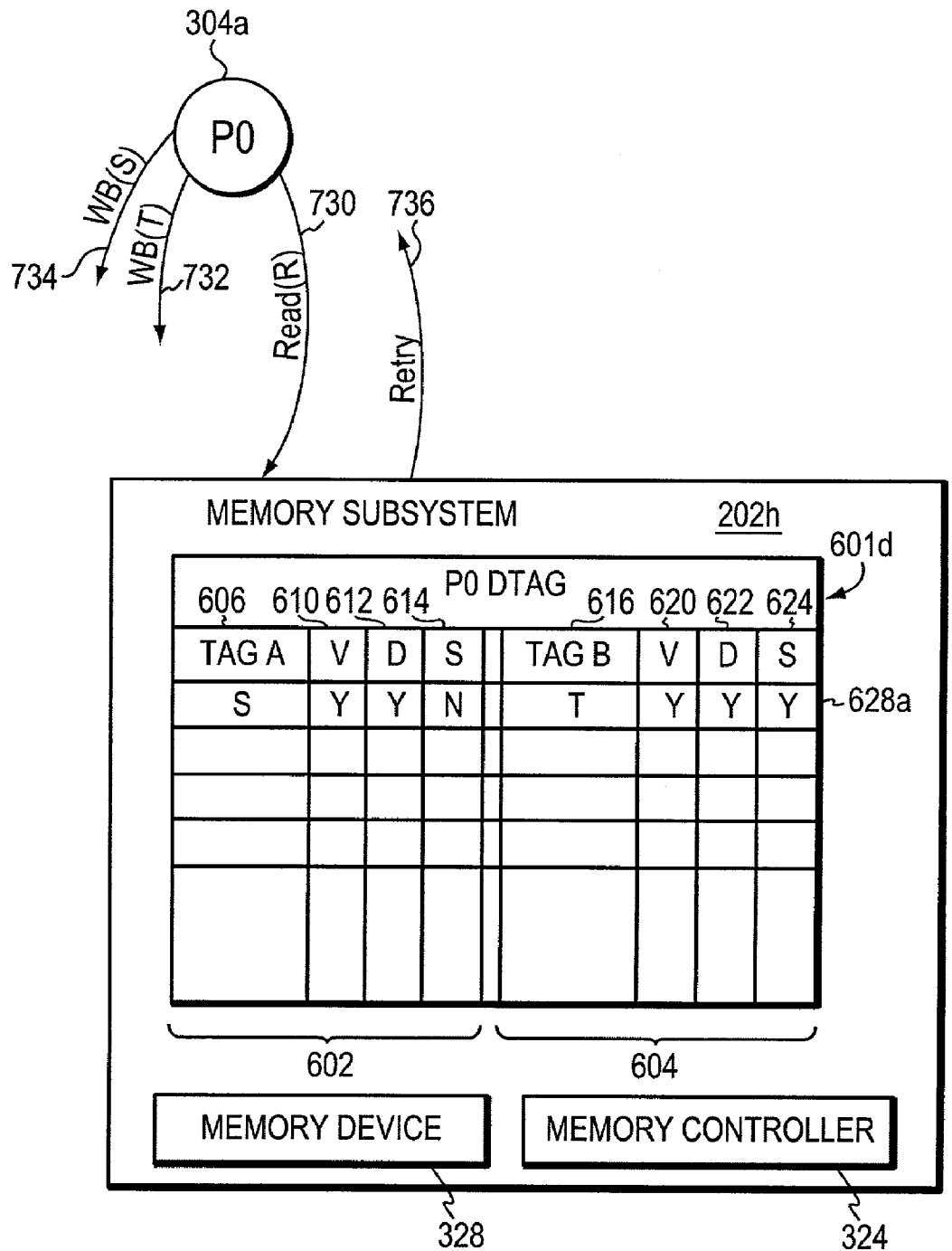

Referring to FIG. 7D, suppose P0 issues a Read command 730 for memory block R. The Read command 730 is routed to the home memory subsystem 202h, which searches the DTAG sections 601 to see whether any other processors have a copy of block R. Suppose further that no other processor has a copy of block R in its cache. The memory controller 324 then accesses the DTAG entry, e.g., entry 628a, that corresponds to the cache line at P0 at which block R would be stored. As shown, the primary region 602 of entry 628a indicates that this cache line is currently storing a dirty copy of block S, while the secondary region 604 indicates that this line previously stored a dirty copy of block T. In this case, the memory controller 324 concludes that there must be two write backs in-flight from P0; a WB command 732 for block T and a WB command 734 for block S. As neither write-back has reach the home memory subsystem 202h, however, the memory controller 324 is precluded from displacing the contents of either the primary region 602 or the secondary region 604, as this could result in stale data being provided to a processor.

Instead, the memory controller 324 preferably responds to P0's Read command 730 with a Retry command 736. Notably, the memory controller 324 does not make any change to the DTAG section 601d established for P0. The Retry command 736 notifies P0 that its Read command 730 for block R failed, and instructs P0 to re-issue the Read command. In response to the Retry command 736, P0 issues another Read command (not shown) for block R. It is presumed that at least one, if not both, of the WB commands 732 and 734 will have reached the home memory subsystem 202h by the time the second Read command is received. If so, there will be at least one free region of DTAG entry is 628a available to store the result of the Read command for block R. If the second Read command for block R is received before both WB commands 732 and 734, the memory controller 324 responds with another Retry command.

It should be understood that the same process would be followed if P0 issued a ReadMod command for block R.

In an alternative embodiment, one or more DTAG sections may include more than two regions. For example, if the condition illustrated in FIG. 7D is expected to be a frequent occurrence a third DTAG region could be added to each DTAG section. With a third DTAG region, receipt of the Read command for block R would cause the contents of the secondary region 604 to be moved to the new third region. The contents of the primary region 602 would then be moved into the secondary region 604 making the primary region 602 available for the Read command.

As the DTAG sections 601 are stored at memory device 328, the memory controller 324 may be configured to dynamically add and remove secondary and/or other additional regions to the DTAGs sections as necessary. For example, in response to the first receipt of a memory reference operation targeting a DTAG entry storing a dirty copy of some other memory block, the memory controller 324 may allocate a portion of memory device for the creation of a secondary region 604. The secondary region could then be utilized to store the dirty copy, making the primary region available to store the received memory reference operation. Similarly, upon expiration of some selected period of non-use, the memory controller 324 may be configured to release the portion of memory device 328 previously allocated for a secondary region 604.

Although the invention has been described with reference to Read and ReadMod commands, those skilled in the art will recognize that the present invention is equally applicable to other types of commands, such as Change_to_Dirty (CTD), Invalidate_to_Dirty (12D) and Full_Block_Write (FBW), among others.

As mentioned above, the processor caches are preferably implemented as direct mapped caches to increase the speed with which they may be searched. Nonetheless, those skilled in the art will recognize that other categories of caches may be used, such as associative and/or set associative. If associative and/or set associative caches are used, data processing entities, such as processors, include the identity of the cache line to be used in memory reference operations, such as Read and ReadMod commands.

It should be understood that the DTAGs 600 need not necessarily be located at the memory subsystems 202. For example, the DTAGs 600 could be disposed at some other component of the SMP system 300, such as the interconnect fabric 206, or at a dedicated DTAG component which, in turn, may be located at any point along the path followed by command packets travelling from the processors (or other data processing entities) to the memory subsystems 202.

It should be further understood that the DTAGs 600 are preferably implemented through one or more content addressable memories (CAMs) to facilitate searching.

As indicated above, write-backs are strictly serialized. That is, at any point in time, the cache coherency protocol ensures that only a single processor can issue a WB command for a given memory block. In the illustrative embodiment, this is accomplished by permitting only a single entity to have write or exclusive access to a given memory block. A second entity requesting write access over the given memory block is not granted such access until the previous owner has either been invalidated or has written the memory block back to main memory. Accordingly, at any given point in time, the cache coherency protocol permits only a single entity to issue a WB command for a given memory block.

The foregoing description has been directed to specific embodiments of the present invention. It will be apparent, however, that other variations and modifications may be made to the described embodiments, with the attainment of some or all of their advantages. For example, the present invention could be implemented in single processor computer systems. Therefore, it is the object of the appended claims to cover all such variations and modifications as come within the true spirit and scope of the invention.

The invention claimed is:

1. An apparatus for use with a computer system having a plurality of processors and a shared memory accessible by the processors, the shared memory organized into a plurality of memory blocks, each processor having a cache with a plurality of lines for storing selected memory blocks, the apparatus comprising:

a duplicate tag (DTAG) that holds information for a given processor, the DTAG having first and second regions, each of the first and second regions having a plurality of entries, and each entry of each region stores an address and one or more states for a cache line at the given processor, whereby for each of a plurality of cache lines at the given processor there is a matching entry in both the first and the second DTAG regions; and a controller operatively coupled to the DTAG, wherein
the controller loads the address and the one or more states into the DTAG entries of the first and second regions, and
for each of two or more cache lines, the address loaded into the two matching entries at the first and second regions is different.

2. The apparatus of claim 1 wherein the controller loads the DTAG entries of the first and second regions in response to memory reference operations issued by the processors.

3. The apparatus of claim 1 wherein
the one or more states of the memory blocks stored in the processor caches include a dirty state and a clean state, and
the controller, in response to a memory reference operation for write access to a first memory block, identifies the entry of the first DTAG region matching the cache line at which the first memory block is to be stored, loads the identified entry with the address of the first memory block and marks the state as dirty.

4. The apparatus of claim 3 wherein
the one or more states of the memory blocks stored in the processor caches include a dirty state and a clean state, and
the controller, in response to a memory reference operation targeting a first memory block, identifies the entry of the first DTAG region matching the cache line at which the first memory block is to be stored, and, provided that the identified entry currently stores the address of a second memory block in the dirty state, copies the address and the one or more states of the second memory block from the matching entry at the first DTAG region into the matching entry at the second DTAG region.

5. The apparatus of claim 4 wherein the controller loads the address and the one or more states of the first memory block in the identified entry of the first DTAG region.

6. The apparatus of claim 5 wherein a given processor, upon writing back to the shared memory a first memory block in the dirty state from a selected cache line, issues a memory reference operation for a second memory block to be stored in the selected cache line, free from waiting for an acknowledgment to the write back.

7. The apparatus of claim 1 wherein
the one or more states of the memory blocks stored in the processor caches include a dirty state and a clean state, and
a given processor, upon writing back to the shared memory a first memory block in the dirty state from a selected cache line, issues a memory reference operation for a second memory block to be stored in the selected cache line, free from waiting for an acknowledgment to the write back.

8. The apparatus of claim 6 wherein the DTAG is stored at the shared memory.

9. The apparatus of claim 6 wherein the shared memory utilizes the DTAG to maintain coherence over cached memory blocks.

10. The apparatus of claim 6 wherein the processor caches are one of direct-mapped, associative, and set-associative caches.

11. A method for use with a computer system having a plurality of processors and a shared memory accessible by the processors, the shared memory organized into a plurality of memory blocks, each processor having a cache organized into a plurality of lines for storing selected memory blocks, the method comprising:
provproviding a duplicate tag (DTAG) for the cache of a given processor;
providing two separate entries in the DTAG for each cache line; and
for a given cache line, entering a first address in the first DTAG entry for the given cache line, and a second address in the second DTAG entry for the given cache line, whereby
the first and second addresses are different.

12. The method of claim 11 further comprising:
in response to a memory reference operation for read access to a first memory block, identifying a first DTAG entry for the cache line at which the first memory block is to be stored;
loading the identified first DTAG entry with an address corresponding to the first memory block; and
setting a state at the identified first DTAG entry to a clean state.

13. The method of claim 12 further comprising:
in response to a memory reference operation targeting a second memory block, identifying the first and second DTAG entries for the cache line at which the second memory block is to be stored;
in response to the identified first DTAG entry currently storing the address of a third memory block in a dirty state, copying the address and the state of the third memory block from the first DTAG entry to the second DTAG entry for the cache line; and
loading the address and the state of the second memory block into the identified first DTAG entry for the cache line.

14. The method of claim 11 further comprising:
in response to a memory reference operation issued by a source processor and targeting a first memory block, identifying the first and second DTAG entries for the cache line at which the first memory block is to be stored; and
in response to both the first and second DTAG entries currently storing an address of a memory block in a dirty state, issuing a retry command to the source processor, the retry command directing the source processor to issue another memory reference operation for the first memory block.

15. The method of claim 11 further comprising:
writing back to the shared memory a first memory block in a dirty state from a selected cache line; and
issuing a memory reference operation for a second memory block to be stored in the selected cache line, wherein the issuing is preformed free from waiting for an acknowledgment to the write back.

16. The method of claim 11 further comprising:
writing back from a source processor to the shared memory a first memory block in a dirty state;
issuing a memory reference operation from the source processor for the first memory block;
detecting whether the memory reference operation is received at the shared memory ahead of the write back; and
issuing a retry to the source processor, provided that the memory reference operation is determined to have been received ahead of the write back.

17. The method of claim 16 wherein the source processor, in response to the retry, issues another memory reference operation for the first memory block.

18. The method of claim 16 wherein detecting comprises determining that at least one of the DTAG entries corresponding to the source processor indicates that the source processor has a copy of the first memory block in a dirty and a valid state.

19. The method of claim 11 further comprising:
providing a DTAG for each processor, each DTAG having two separate entries for each cache line;
in response to a memory reference operation from a first processor specifying a first memory block, searching both entries of the DTAG for each processor for an address match to the first memory block;
identifying two DTAG entries corresponding to the same cache line at a second processor whereby one identified entry has an address match to the first memory block and indicates that the first memory block is in a dirty state at the second processor, and the other identified entry indicates a different memory block is at the same cache line at the second processor; and
issuing a snoop to the first processor targeting the first memory block.

20. The method of claim 19 further comprising:
determining that the snoop misses at the cache of the second processor; and
employing a late-race resolution mechanism to provide the first memory block to the first processor in response to the memory reference operation.

* * * * *

UNITED STATES PATENT AND TRADEMARK OFFICE
CERTIFICATE OF CORRECTION

| | |
|---|---|
| PATENT NO. | : 7,024,520 B2 |
| APPLICATION NO. | : 10/263740 |
| DATED | : April 4, 2006 |
| INVENTOR(S) | : Gregory E. Tierney et al. |

It is certified that error appears in the above-identified patent and that said Letters Patent is hereby corrected as shown below:

In column 9, line 36, delete "to" before "space".

In column 18, lines 46-47, delete "is" before "628a".

In column 19, line 16, delete "(12D)" and insert -- (I2D) --, therefor.

In column 22, line 6, in Claim 15, delete "preformed" and insert -- performed --, therefor.

Signed and Sealed this

Twenty-first Day of April, 2009

JOHN DOLL
*Acting Director of the United States Patent and Trademark Office*